United States Patent
Hawk et al.

(10) Patent No.: US 10,772,304 B2
(45) Date of Patent: *Sep. 15, 2020

(54) SELF-BALANCING POULTRY WATER DISTRIBUTION SYSTEM

(71) Applicant: LUBING Maschinenfabrik Ludwig Bening GmbH & Co. KG, Barnstorf (DE)

(72) Inventors: Chris Hawk, Chattanooga, TN (US); John Hawk, Cleveland, TN (US); Charles O Willis, Jr., Cleveland, TN (US); Dustin Hicks, Georgetown, TN (US); Shawn Willis, Cleveland, TN (US)

(73) Assignee: LUBING Maschinenfabrik Ludwig Bening GmbH & Co. KG, Barnstorf (DE)

(*) Notice: Subject to any disclaimer, the term of this patent is extended or adjusted under 35 U.S.C. 154(b) by 2 days.

This patent is subject to a terminal disclaimer.

(21) Appl. No.: 16/157,066

(22) Filed: Oct. 10, 2018

(65) Prior Publication Data
US 2019/0116766 A1 Apr. 25, 2019

Related U.S. Application Data

(60) Provisional application No. 62/575,339, filed on Oct. 20, 2017, provisional application No. 62/584,394, filed on Nov. 10, 2017.

(51) Int. Cl.
*A01K 39/02* (2006.01)
*A01K 39/022* (2006.01)
*A01K 39/026* (2006.01)

(52) U.S. Cl.
CPC .......... *A01K 39/022* (2013.01); *A01K 39/026* (2013.01); *A01K 39/0213* (2013.01)

(58) Field of Classification Search
CPC .............. A01K 39/0213; A01K 39/024; A01K 5/0216; A01K 7/02; A01K 9/00
(Continued)

(56) References Cited

U.S. PATENT DOCUMENTS 5,138,980 A 8/1992 Ewing
5,184,571 A 2/1993 Hosteller
(Continued)

OTHER PUBLICATIONS

International Search Report and Written Opinion issued in PCT/EP2018/000473 dated Jan. 30, 2019 (14 pages).

*Primary Examiner* — Yvonne R Abbott-Lewis
(74) *Attorney, Agent, or Firm* — FisherBroyles LLP; Keats A. Quinalty

(57) ABSTRACT

An improved, self-balancing water distribution system uses siphon characteristics to maintain negative pressure within the water system and to enable distribution of water to one or more distribution points, such as drinker lines with drinker nipples, at a controlled pressure, for consumption by poultry. The system includes water conduit connected to and configured to distribute water from a water supply reservoir to the one or more distribution points. The water level of the water supply reservoir is used to control the water pressure within the system. A vacuum apparatus is connected to the water conduit to remove entrapped air within the system to help maintain negative pressure within the conduit and throughout the system.

20 Claims, 19 Drawing Sheets

(58) Field of Classification Search
USPC .................................. 119/72, 71, 72.5, 74, 81
See application file for complete search history.

(56) References Cited

U.S. PATENT DOCUMENTS

| | | | | |
|---|---|---|---|---|
| 5,429,072 | A * | 7/1995 | Schumacher | A01K 7/02 119/72 |
| 5,522,346 | A * | 6/1996 | Clark, IV | A01K 39/0213 119/72.5 |
| 5,870,970 | A * | 2/1999 | Katz | A01K 39/0213 119/72 |
| 6,016,769 | A * | 1/2000 | Forster | A01K 5/0216 119/71 |
| 6,202,682 | B1 * | 3/2001 | Johnson | G05D 16/0669 137/495 |
| 6,712,021 | B2 * | 3/2004 | Pollock | A01K 39/0213 119/72 |
| 8,028,356 | B2 * | 10/2011 | Kao | E03C 1/08 119/72 |
| 8,056,509 | B1 * | 11/2011 | Hostetler | A01K 39/0213 119/72 |
| 8,733,392 | B2 * | 5/2014 | Smith | B05B 12/088 137/505.41 |
| 9,004,098 | B2 * | 4/2015 | Roes | A01K 39/0213 137/505.14 |
| 10,292,372 | B2 * | 5/2019 | Eversole | A01K 39/0213 |
| 2008/0276873 | A1 * | 11/2008 | Waldner | A01K 5/0216 119/51.5 |
| 2015/0136262 | A1 | 5/2015 | Willis | |

* cited by examiner

SELF-BALANCING POULTRY WATER DISTRIBUTION SYSTEM

CROSS REFERENCE TO RELATED APPLICATIONS

This application claims priority benefit under 35 U.S.C. § 119(e) to U.S. Provisional Patent Application Nos. 62/575,339, entitled "Self-Balancing Livestock Water Distribution System," filed Oct. 20, 2017, and 62/584,394, also entitled "Self-Balancing Livestock Water Distribution System," filed Nov. 11, 2017, both of which are hereby incorporated by reference in their entirety as if set forth in full herein.

FIELD OF THE PRESENT TECHNOLOGY

The present invention relates generally to poultry watering systems and, more particularly, to an improved, self-balancing water distribution system that uses negative pressure to distribute a water supply to one or more distribution points at a controlled pressure for consumption by poultry.

BACKGROUND OF THE PRESENT TECHNOLOGY

Conventional poultry watering systems include a series of connected water dispensing lines, a plurality of interconnected valves connected to one or more low pressure water supply lines, fed by one or more potable water sources. The potable water supply is typically provided to a poultry or broiler house ("facility") at a pressure much greater than the intended or necessary operating pressure of the water pressure regulators and at a much greater pressure than is desired at each drinker nipple accessible to the poultry. In the past, this has conventionally required that one or more water pressure regulators be used to adjust the water pressure at the drinker nipples used by the flock to obtain water. Furthermore, it is often required that the operating pressure for the drinker nipples be varied throughout the growth period of the poultry flock to allow for the greatest efficiency of use of water by the flock. For example, too little water to the flock decreases the flock growth performance while excess water can lead to poor litter conditions, which can adversely affect the health of the flock. Furthermore, if the system fails and the birds are deprived of water, within a short period of time, the flock will die. This is a huge loss of investment for the growers and integrators and must be avoided. This requires that safeguards be in place to prevent system failure, or at a minimum, in the event of a failure, alert the grower in a timely manner so that action can be taken.

Conventionally, controlling the amount of water and water pressure to a poultry watering system is handled manually by an operator in the facility—at each individual watering valve. However, manual operation and adjustment of each individual water pressure regulator used to control the water supply to the poultry drinker lines is not efficient and can lead to over or under watering of the flock. Hydraulic air pressure control systems and systems utilizing proportional valves have been developed and are used in the industry, but these systems tend to be inconsistent in operation, overly complex, expensive to own and operate, difficult to install and calibrate, and require continued maintenance and adjustment for reliable operation.

For these and many other reasons, there is a need in the industry to be able to vary the operating pressure of the water supply system feeding the drinker lines consistently, efficiently, and inexpensively while reducing the complexity of the system. It is also desirable to be able to retrofit existing watering systems with minimal effort and at low cost. Siphon systems have not been used in the past in this industry or for this purpose because they are typically fragile in nature and require constant monitoring.

It would be advantageous to be able to control the water pressure supplied to poultry drinker systems remotely and/or automatically through use of a self-balancing gravity-fed water supply system utilizing a mechanically or electrically-controlled water supply, a Water Conduit system operating at low pressures, and having a system for removing entrapped air from the conduit system to prevent the system from losing water pressure and further to eliminate the need for having a facility operator manually calibrate and adjust the water pressure at a plurality of drinker lines and drinker line regulator in the facility. Preferably, it would be desirable for such pressure adjusting systems to be controlled either (i) with feedback from an electrical water pressure feedback device—in the form of a closed-loop system, or (ii) without a feedback device—in the form of an open-loop system. Preferably, either of these control configurations would be commanded through the use of one or more manual user interfaces and/or through an electronic interface.

Although a "facility" has been described above and will generally be used interchangeably hereinafter to refer to a poultry house, it will be understood by those of skill in the art that any facility that waters animals, and that requires water pressure regulators to control or limit the water pressure of the water supplied to the drinking nipples, as compared to the water pressure coming into the facility, can make effective use of the systems, techniques, technologies, devices, and processes described herein. Such facilities include, but are not limited to, poultry broiler, breeder, pullet, or egg laying houses.

The present invention meets one or more of the above-referenced needs as described herein below in greater detail.

SUMMARY OF THE PRESENT TECHNOLOGY

The present invention relates generally to poultry watering systems and, more particularly, to an improved, self-balancing water distribution system that uses negative pressure to distribute a water supply to one or more distribution points at a controlled pressure for consumption by poultry. Briefly described, aspects of the present invention include the following.

In a first aspect of the present invention, a poultry watering system comprises a water supply reservoir containing an amount of potable water therein, the potable water within the reservoir defining a water level associated with the reservoir; one or more water distribution points for providing the potable water to a flock of poultry at a desired pressure level; and water conduit connecting the water supply reservoir to the one or more water distribution points, the water conduit configured to be substantially filled with pressurized potable water maintained at a negative pressure; wherein the desired pressure level of the potable water provided to the flock is directly responsive to the water level associated with the reservoir.

In a feature, each of the one or more water distribution points comprises a drinker line and a water column having a water level, the drinker line having a plurality of drinker nipples for providing the potable water to the flock of poultry at the desired pressure level, wherein the water level within the water column established the desired pressure level of the potable water at the drinker nipples.

Preferably, the poultry watering system is mounted within a poultry house having a floor and the water supply reservoir and the water distribution points are positioned at relatively similar heights above the floor such that the water level within the water column is the same height above the floor as the water level associated with the reservoir.

In one embodiment, the water level associated with the reservoir is adjusted by adding or removing water from the reservoir. In another embodiment, the water level associated with the reservoir is adjusted by physically adjusting the height of the reservoir above the floor.

In a feature, the water supply reservoir is a tank containing non-pressurized, potable water and the water conduit connects near the bottom of the water supply reservoir.

In a feature, the water conduit is further configured to have one peak location disposed above the water supply reservoir and the one or more water distribution points, wherein air entrapped within the water conduit accumulates at the peak location; and wherein an air removal component is connected to the water conduit at the peak location and configured to remove the entrapped air as needed to maintain the negative pressure within the water conduit.

Preferably, the air removal component includes an air reservoir connected to the water conduit above the peak location, the air removal component further includes a vacuum apparatus having a vacuum line connected to the air reservoir for aspirating the entrapped air and an exhaust line for discharging the aspirated air into the water supply reservoir.

In yet a further feature, the vacuum apparatus removes a mixture of entrapped air and water from the air reservoir and discharges the air/water mixture into the water supply reservoir. Preferably, the water supply reservoir is open to atmosphere and the water from the air/water mixture discharged into the water supply reservoir is recycled back into the water conduit and the air from the air/water mixture discharged into the water supply reservoir is released to the atmosphere.

In another feature, the air reservoir includes a high level water sensor to detect when the amount of entrapped air is less than a desired minimum threshold such that entrapped air does not need to be removed to maintain negative pressure within the water conduit.

In another feature, the air reservoir includes a low level water sensor to detect when the amount of entrapped air is more than a desired maximum threshold such that entrapped air needs to be removed to maintain negative pressure within the water conduit. Preferably, when the low level water sensor detects that the amount of entrapped air is more than the desired maximum threshold, pressurized water is added directly to the water conduit through a water supply that by-passes the water supply reservoir.

Preferably, the air removal component further includes a check valve to prevent backflow of aspirated air from the vacuum apparatus into the air reservoir.

In another feature, the water conduit further includes a check valve to prevent the backflow of water from the water conduit into the water supply reservoir.

In a second aspect of the present invention, a poultry watering system comprises water conduit connecting a potable water supply to one or more water distribution points, the water conduit configured to be substantially filled with pressurized potable water maintained at a negative pressure; the one or more water distribution points providing the potable water to a flock of poultry at a desired pressure level, wherein each of the one or more water distribution points comprises a drinker line and a water column having a water level, the drinker line having a plurality of drinker nipples for providing the potable water to the flock of poultry at the desired pressure level, wherein the water level within the water column establishes the desired pressure level of the potable water at the drinker nipples; and a water supply valve and a pressure sensor connected to the water conduit, the water supply valve responsive to pressure within the water conduit detected by the pressure sensor and configured to control the flow of potable water from the potable water supply into the water conduit; wherein the desired pressure level of the potable water provided to the flock is directly responsive to the pressure of the water in the water conduit detected by the pressure sensor.

In a feature, the water conduit is further configured to have one peak location disposed above the one or more water distribution points, wherein air entrapped within the water conduit accumulates at the one peak location and wherein an air removal component is connected to the water conduit at the one peak location and configured to remove the accumulated entrapped air as needed to maintain the negative pressure within the water conduit.

Preferably, the air removal component includes an air reservoir connected to the water conduit above the one peak location, the air removal component further including a vacuum apparatus having a vacuum line connected to the air reservoir for aspirating the entrapped air and an exhaust line for discharging the aspirated air into one or more of the water distribution points. Yet further, the vacuum apparatus removes a mixture of entrapped air and water from the air reservoir and discharges the air/water mixture into the one or more of the water distribution points, wherein the one or more of the water distribution points is open to atmosphere and wherein the water from the air/water mixture is provided to the flock through one or more of the drinker lines and the air from the air/water mixture is released to the atmosphere through a breather associated with the one or more of the drinker lines.

In another feature, the air removal component includes an air reservoir connected to the water conduit above the one peak location, the air removal component further including both the water supply valve for receiving the potable water under pressure from the potable water supply and an air release valve for discharging accumulated entrapped air to atmosphere, the water supply valve and the air release valve activated as needed to maintain the negative pressure within the water conduit.

The present inventions also encompasses a computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention.

The above features as well as additional features and aspects of the present invention are disclosed herein and will become apparent from the following description of preferred embodiments.

The foregoing summary, as well as the following detailed description of illustrative embodiments, is better understood when read in conjunction with the appended drawings. For the purpose of illustrating the embodiments, there is shown in the drawings example constructions of the embodiments;

however, the embodiments are not limited to the specific methods and instrumentalities disclosed.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1A:
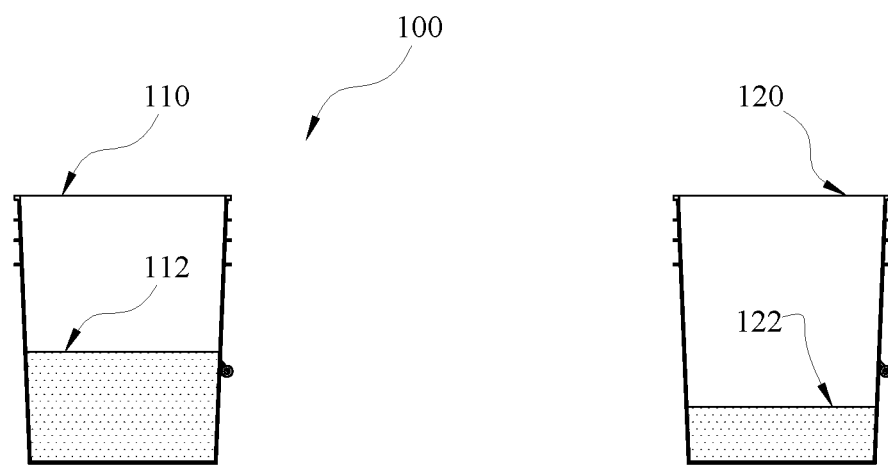
FIGS. 1A-1F illustrate an increasingly complex series of schematics of a conventional negative pressure water siphon system that exists between two connected water or fluid containers.

Before the present technologies, systems, products, articles of manufacture, apparatuses, and methods are disclosed and described in greater detail hereinafter, it is to be understood that the present technologies, systems, products, articles of manufacture, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be part of or otherwise used to perform the described technologies, systems, products, articles of manufacture, apparatuses, and methods. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all technologies, systems, products, articles of manufacture, apparatuses, and methods. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed technologies, systems, products, articles of manufacture, apparatuses, and methods.

As will be appreciated by one skilled in the art, embodiments of the present technologies, systems, products, articles of manufacture, apparatuses, and methods may be described below with reference to block diagrams and flowchart illustrations of methods, systems, processes, steps, and apparatuses. It will be understood that each block of the block diagrams and flow illustrations, respectively, support combinations of means for performing the specified functions and/or combinations of steps for performing the specified functions.

As will further be appreciated by one skilled in the art, the present technologies, systems, products, articles of manufacture, apparatuses, and methods may take the form of an entirely new hardware embodiment, an entirely new software embodiment, or an embodiment combining new software and hardware aspects. Furthermore, the present technologies, systems, products, articles of manufacture, apparatuses, and methods may take the form of a computer program product on a computer-readable storage medium having computer-readable program instructions (e.g., computer software) embodied in the storage medium. More particularly, the present technologies, systems, products, articles of manufacture, apparatuses, and methods may take the form of web-implemented computer software. Any suitable computer-readable storage medium may be utilized including hard disks, non-volatile flash memory, CD-ROMs, optical storage devices, and/or magnetic storage devices.

Embodiments of the present technologies, systems, products, articles of manufacture, apparatuses, and methods are described below with reference to block diagrams and flowchart illustrations of methods, systems, apparatuses and computer program products. It will be understood that each block of the block diagrams and flow illustrations, respectively, can be implemented, in some cases, by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A. Background Operational Theory of System

1. Glossary of Basic Terms

Demand: when the poultry or other livestock drink water from the watering system.

Negative Pressure: pressure that is lower than atmospheric pressure.

Reservoir 1: the container in which the water level or water pressure is monitored and controlled using mechanical or electrical methods.

Reservoir 2: the container on which there is Demand or removal of water, which causes changes in water level or water pressure within the system.

Water Conduit: a passage or interconnection between Reservoir 1 and Reservoir 2 through which water can pass, such as but not limited to a pipe, tube, hose, or duct, and constructed in a way to minimize friction pressure losses during operation.

Entrapped Air: air that becomes trapped in the Water Conduit, which, in large volumes, can cause Negative Pressure in the system to equalize with the local atmospheric pressure, resulting in system failure.

Air Reservoir: a reservoir with the purpose of capturing Entrapped Air that becomes trapped in the system without interrupting flow through the Water Conduit.

Vacuum Apparatus: any device being used for the purpose of removing Entrapped Air from the Air Reservoir.

Check Valve: valve that is open to flow in one direction but closed to flow in the opposite direction.

Charge: a state of operation during which the system is initially energized with high pressure water for the purpose of filling the Water Conduit with water and removing all the air from the system.

Flush: a state of operation during which the system is energized with high pressure water for the purpose of purging the Water Conduit and other drinker lines of the watering system.

2. Operational Theory

As shown in FIG. 1A, an environment 100 in which two bodies of water exist, contained within Reservoir 1 (110) and Reservoir 2 (120), having the same or different levels of water columns 112, 122, will remain static in level.

Figure 1B:
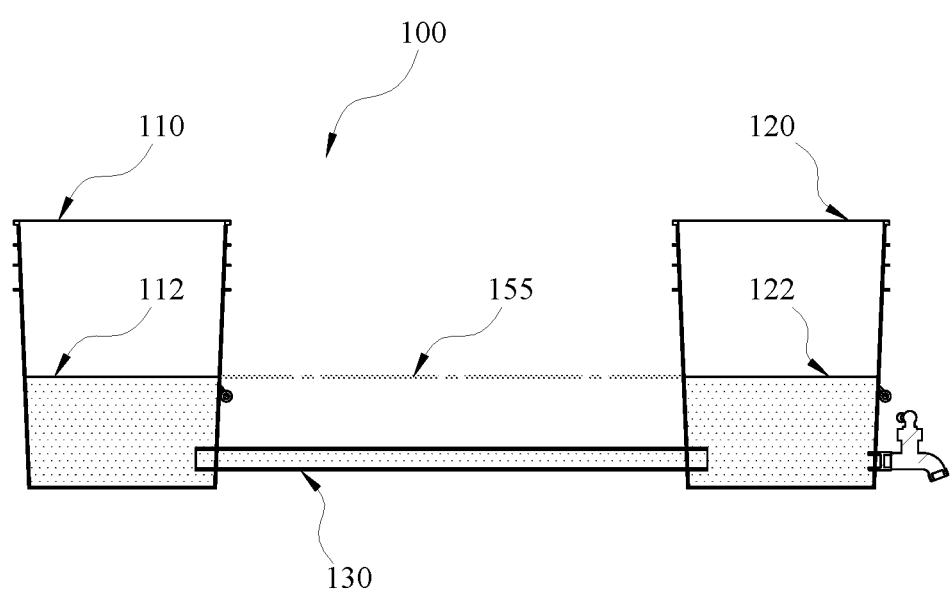

As shown in FIG. 1B, if the two reservoirs 110, 120 are then interconnected using a Water Conduit 130 that is located beneath the surface of the water levels 112, 122 of the two reservoirs, will cause the Water Conduit 130 to flood with water as the water begins to flow from the reservoir having the higher water level into the reservoir having the lower water level. This flow will continue until the levels of the water in the two reservoirs are balanced at an equilibrium water level 155, and thus equal in static pressure within the Water Conduit 130.

Figure 1C:
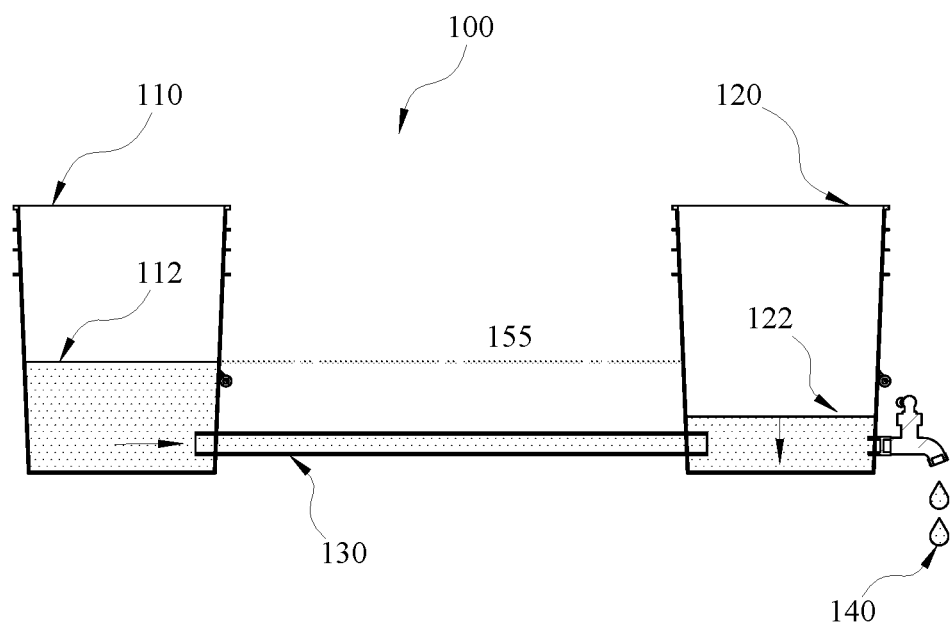

As shown in FIG. 1C, when Demand 140 is introduced to Reservoir 2 (120), which causes water to be drawn out of Reservoir 2 (120), a loss of static pressure occurs at the Water Conduit 130 causing the water level 122 in Reservoir 2 (120) to drop immediately. Due to this loss of static pressure, flow will start from Reservoir 1 (110) to Reservoir 2 (120) and the water level 112 in Reservoir 1 (110) will drop to compensate for the Demand 140 and the lowering water level 122 in Reservoir 2 (120). This drop will continue to happen in response to the Demand 140 until the water levels 112, 122 in both reservoirs 110, 120 are once again balanced at the same equilibrium water level 155.

Figure 1D:
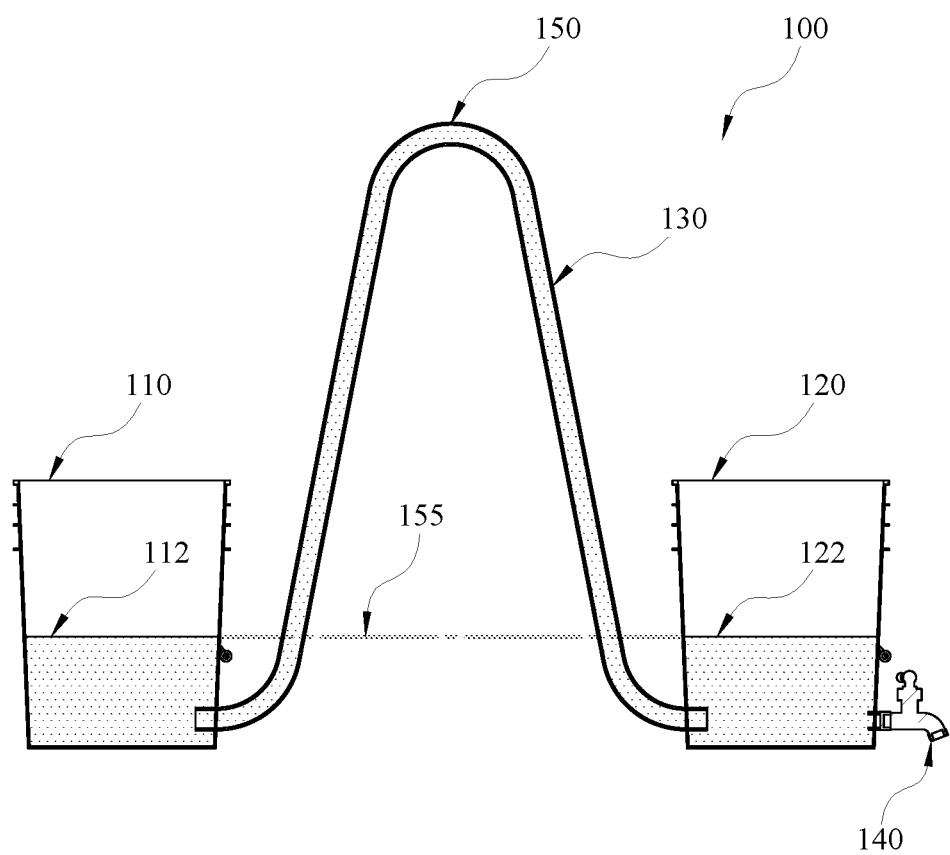

As shown in FIG. 1D, the concept described with respect to FIG. 1C is equally applicable to a situation in which the Water Conduit 130 is not straight or substantially horizontal beneath the water levels 112, 122 of the reservoirs 110, 120, but rather, has a peak 150 between the two reservoirs 110, 120 and above the water levels 112, 122. The connecting points of the Water Conduit 130 with each reservoir 110, 120 must still be below the water levels 112, 122 in each reservoir 110, 120. The introduction of the Water Conduit 130 with this peak 150 will balance the levels 112, 122 in the two reservoirs 110, 120 the same way as before; thus, they will be equal in static pressure once again.

Figure 1E:
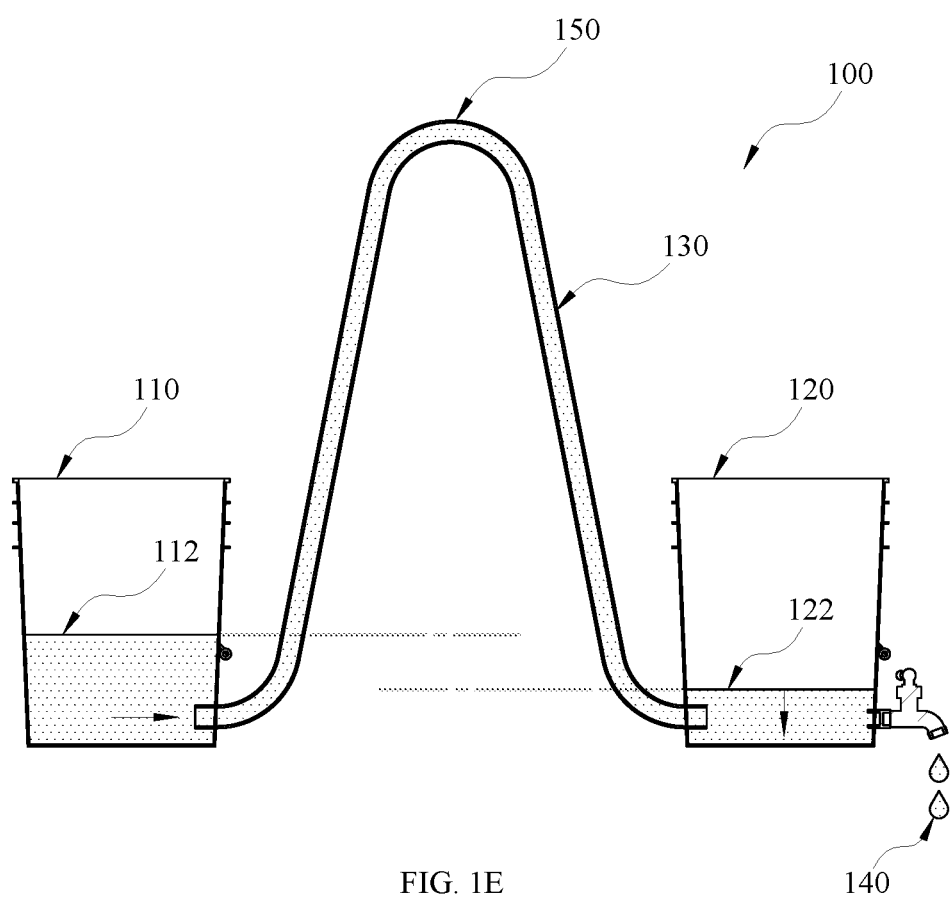
Figure 1F:
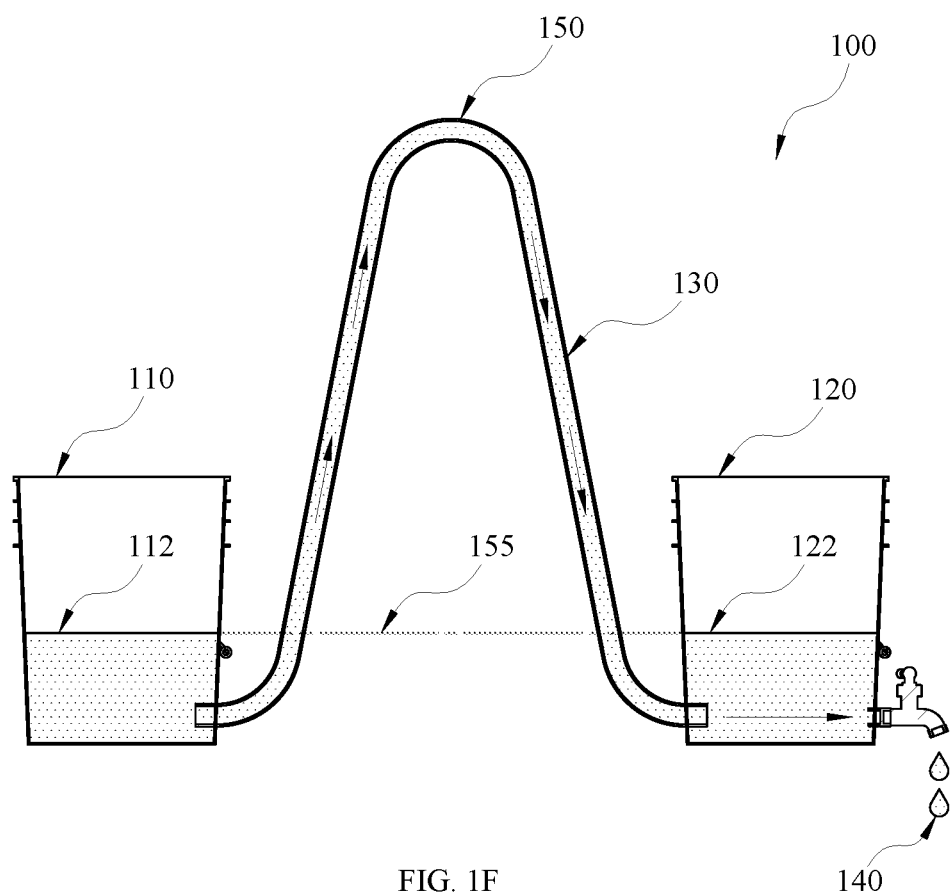

As shown in FIG. 1E, similar to the system described in FIG. 1C, when Demand 140 is then introduced, a pressure differential occurs within the Water Conduit 130. This causes the immediate drop of water level 122 in Reservoir 2 (120). As soon as Demand 140 occurs, water from Reservoir 1 (110) begins to flow through the Water Conduit 130 to Reservoir 2 (120) in an attempt to balance the levels 112, 122 between the two water reservoirs 110, 120. Water will continuously flow from Reservoir 1 (110) to Reservoir 2 (120) until equilibrium water level 155 is reached, as shown in FIG. 1F.

Figure 2A:
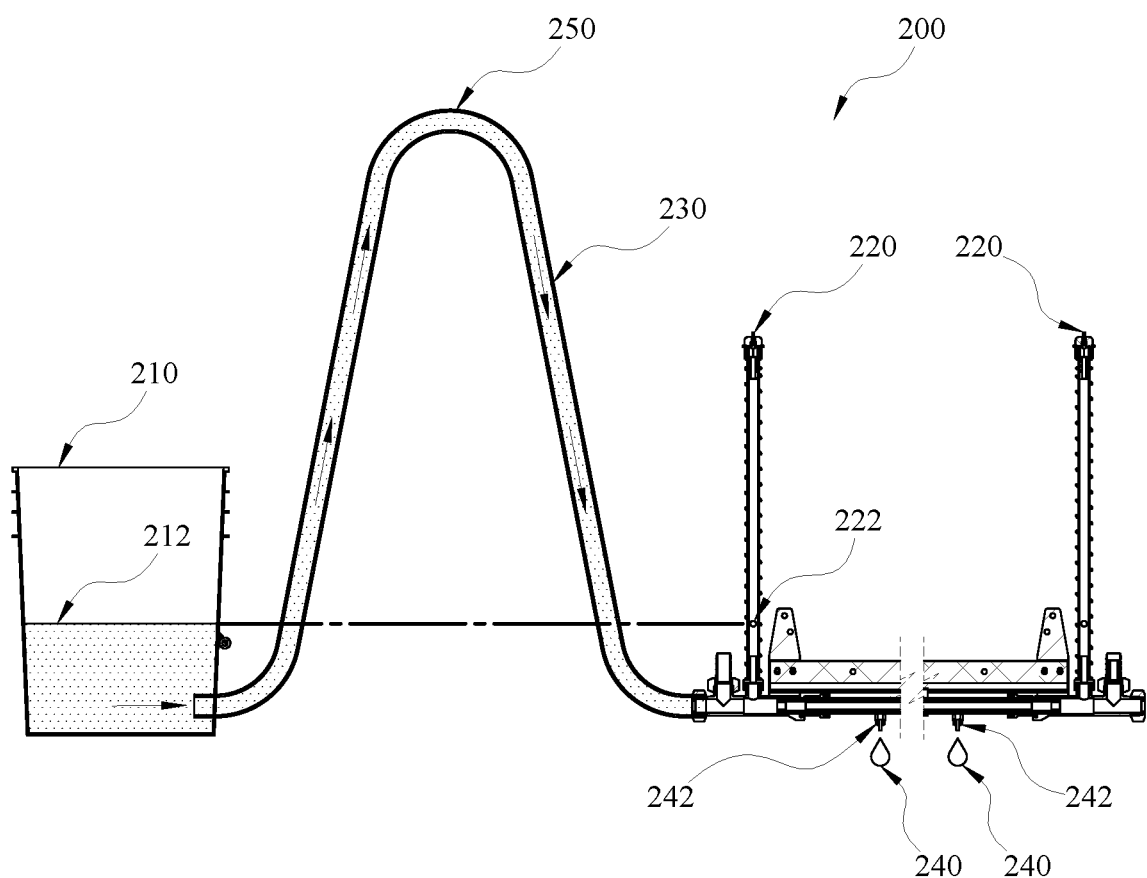
FIGS. 2A-2F illustrate an increasingly complex series of schematics of a poultry watering system that makes use of the negative pressure water siphon characteristics illustrated in FIGS. 1A-1F.

The above description of the system 100 of FIGS. 1A-1F has been shown using two reservoirs 110, 120 with a Water Conduit 130 extending between them. Moving forward, as shown in FIG. 2A, Reservoir 2 (120) will no longer be described merely as a body of water, but rather as poultry drinker lines 220. Also, Demand 240 more specifically represents poultry drinking (e.g., from drinking nipples 242) from the drinker lines 220.

The general physics of this system 200 remain the same as system 100 with the introduction of the drinker lines 220. When poultry drink water from the drinker lines 220, a pressure differential occurs. This pressure differential causes water to flow from Reservoir 1 (210) through the Water Conduit 230 into the drinker lines 220. When there is no Demand 240 on the drinker lines 220, a pressure differential cannot occur, and in turn, the system 200 and water levels 212, 222 remain static and at equilibrium.

Figure 2B:
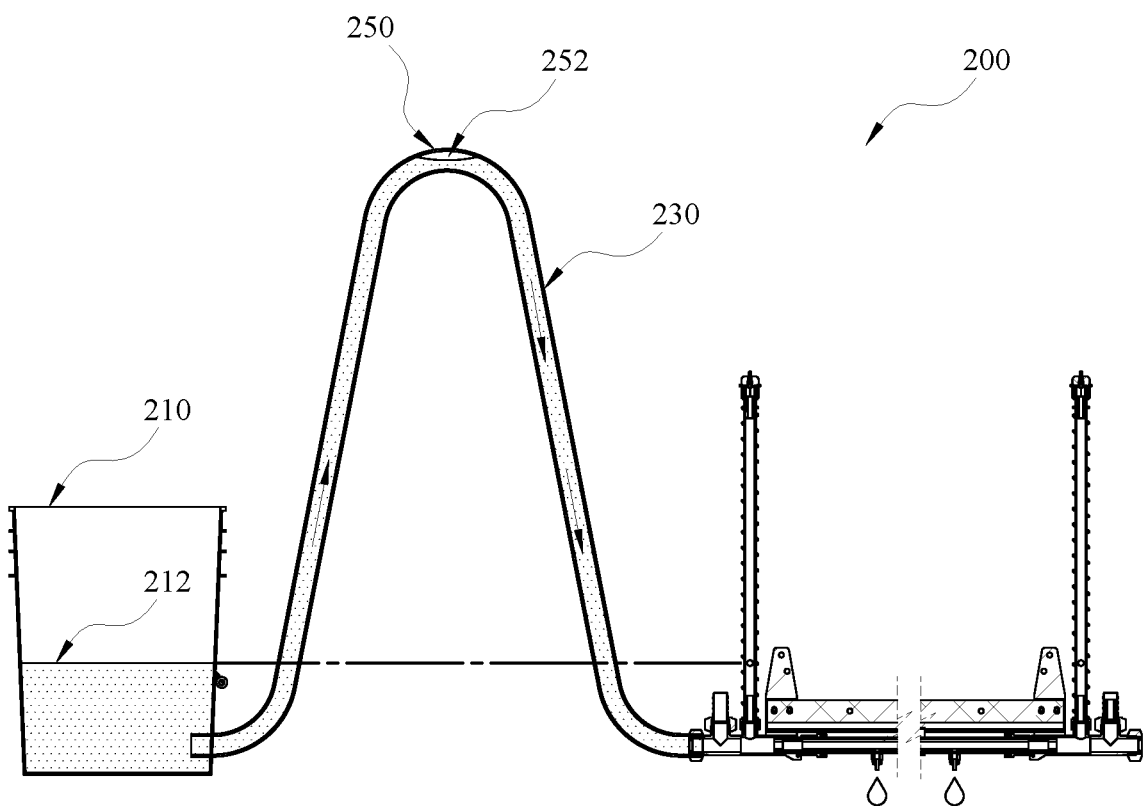
Figure 2C:
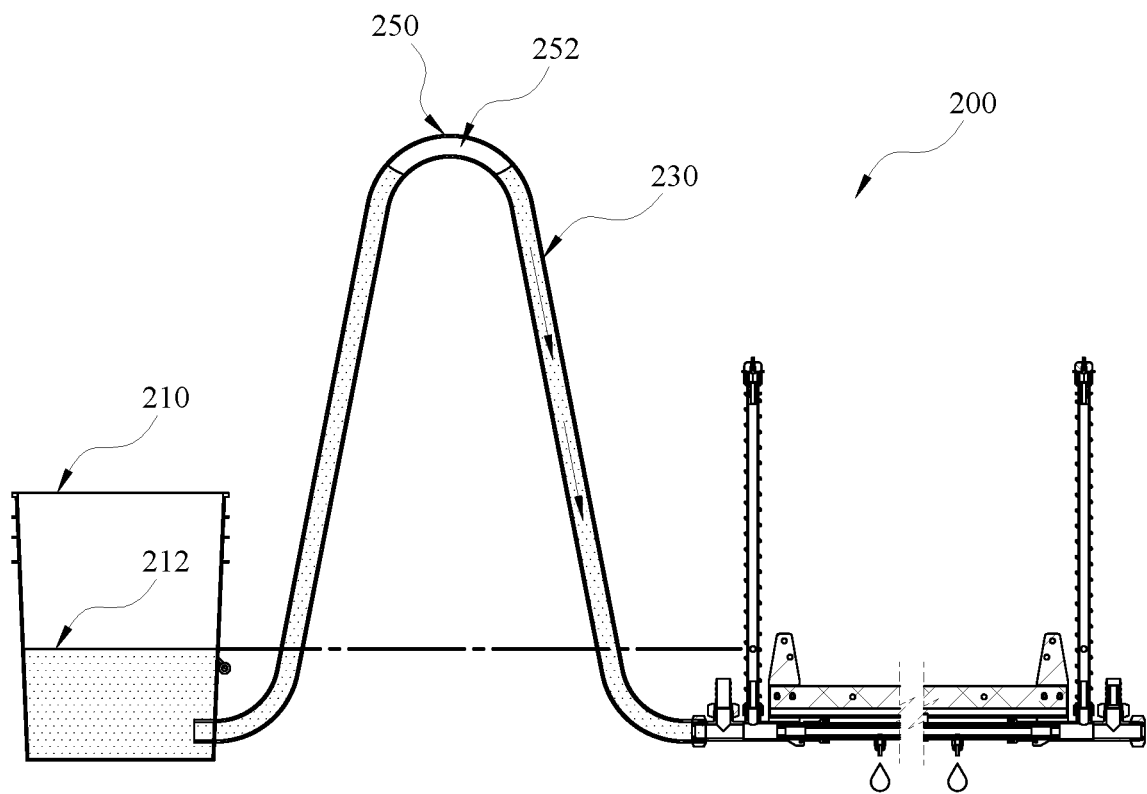

During operation, air can become entrapped in the system 200 due to poor plumbing, aerated water conditions, or other reasons. As shown in FIG. 2B, the Entrapped Air 252 will find its way to the highest point in the system 200, which occurs at the peak 250 in the Water Conduit 230. If the Entrapped Air 252 is not removed, it will lead to reduced or interrupted flow across the peak 250. A continuous air buildup can cause a full blockage in the system 200 and eventually lead to loss of water pressure within the Water Conduit 230, and an effective system failure, as shown in FIG. 2C.

Figure 2D:
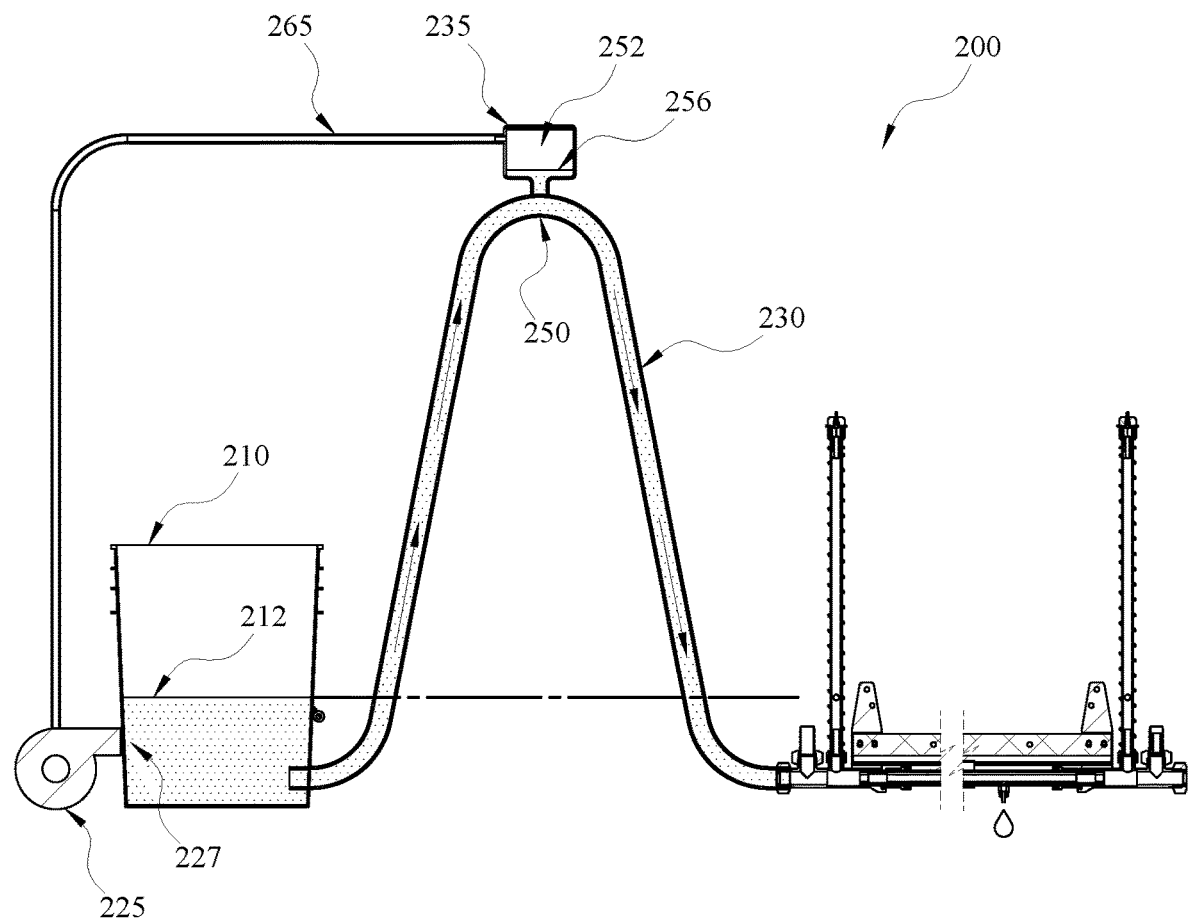

As shown in FIG. 2D, to prevent air buildup and potential system failure, it is preferable to include an effective and efficient solution to remove air from the peak 250 of the Water Conduit 230. Because the system 200 is under Negative Pressure, a simple air release valve will not suffice. For example, when air builds up and a simple air release valve is opened, the Negative Pressure of the system 200 would rapidly draw air into the system 200 instead of evacuating it from the system 200. For this reason, it has been determined that a Vacuum Apparatus 225 provides a preferred solution to enable Entrapped Air 252 to be removed without jeopardizing the Negative Pressure maintained by the system 200. For this to be accomplished efficiently, an Air Reservoir 235 is also preferably included and placed at the peak 250 of the Water Conduit 230 in the system 200. This Air Reservoir 235 allows for a certain volume of Entrapped Air 252 to collect in a centralized location without interrupting water flow. There remains some minimum level of water 256 within the Air Reservoir 235. The Air Reservoir 235 is connected to the Vacuum Apparatus 225 using a vacuum line 265, which is connected generally near the top or highest point of the Air Reservoir 235.

An alternative method of purging Entrapped Air 252 from the Air Reservoir 235 utilizes the vacuum line 265 without the Vacuum Apparatus 225 and relies upon the charge/flush valve to pressurize the system 200, purging the air from the Air Reservoir 235 through the vacuum line 265 into the bottom of Reservoir 1 210, allowing the air to vent to atmosphere. The vacuum line 265 positioned below the water level in Reservoir 1 210 acts as a Check Valve, preventing air from flowing backwards into the Air Reservoir 235. This is not the preferred method for managing air in the Air Reservoir 235 as this pressurizes the Water Conduit 230 and all the reservoirs, causing the system 200 to deviate from the desired water level.

Figure 2E:
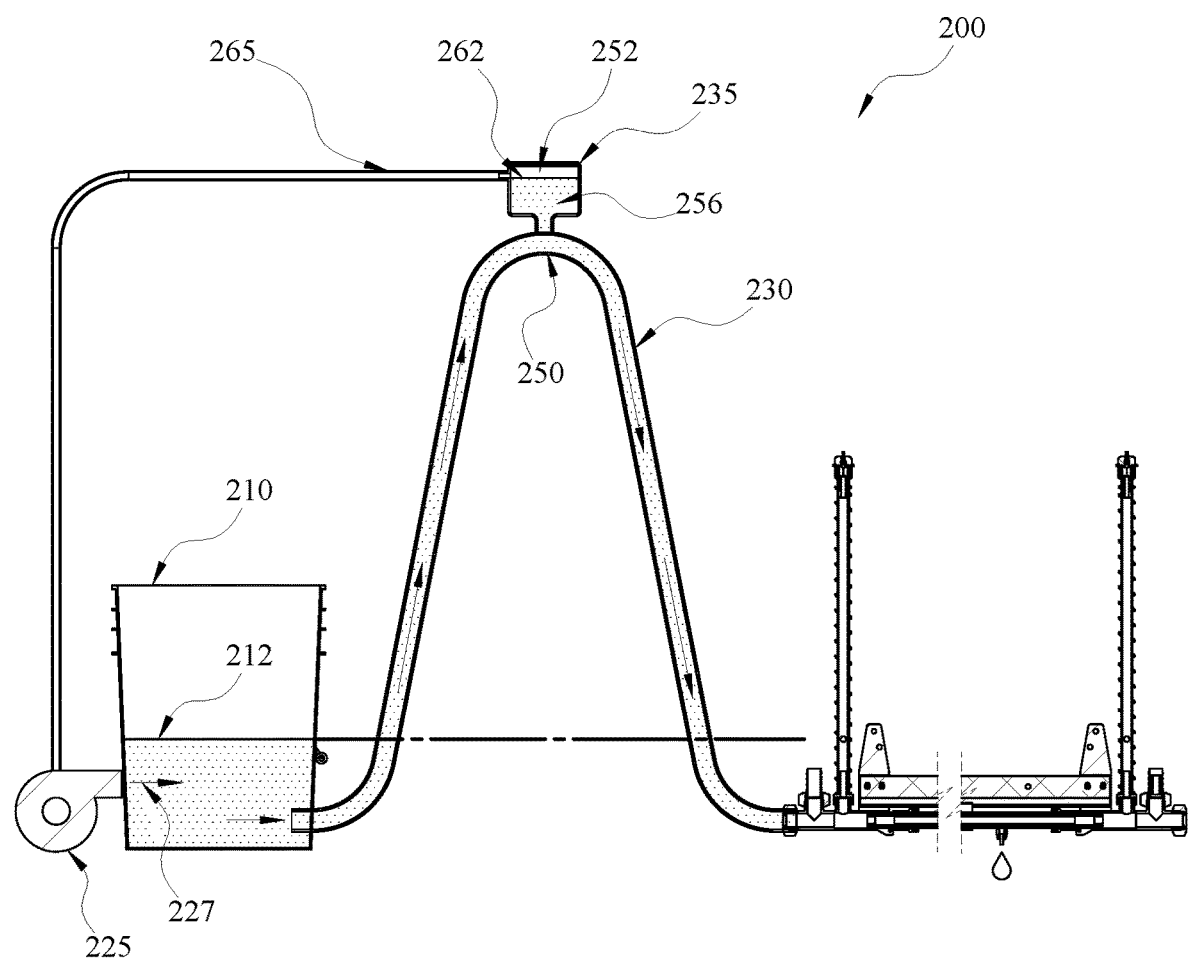

As shown in FIG. 2E, inside the Air Reservoir 235, one or more sensors (not shown) measure the level 262 of water 256 within the Air Reservoir 235, which defines the dividing line between the Entrapped Air 252 and the water 256 within the Air Reservoir 235. The sensor is preferably connected to a control circuit or controller (not shown but described in greater detail hereinafter) in communication with the Vacuum Apparatus 225. The accumulated, Entrapped Air 252 can then be purged from the system 200 automatically through the vacuum line 265 using the Vacuum Apparatus 225. When the Entrapped Air 252 is purged from the Air Reservoir 235, it returns to Reservoir 1 (210) via the vacuum line 265 in the form of an air/water mix 227. Advantageously, this allows all the water 256 removed by the Vacuum Apparatus 225 from the Air Reservoir 235 to be recycled. This process acts as a Check Valve for the Vacuum Apparatus 225 when the Vacuum Apparatus 225 is placed below the water level 212 to allow the removed air to release to the atmosphere out of the top of Reservoir 1 (210) and prevents it from entering back into the pressurized water supply in the Water Conduit 230 of the system 200.

Figure 2F:
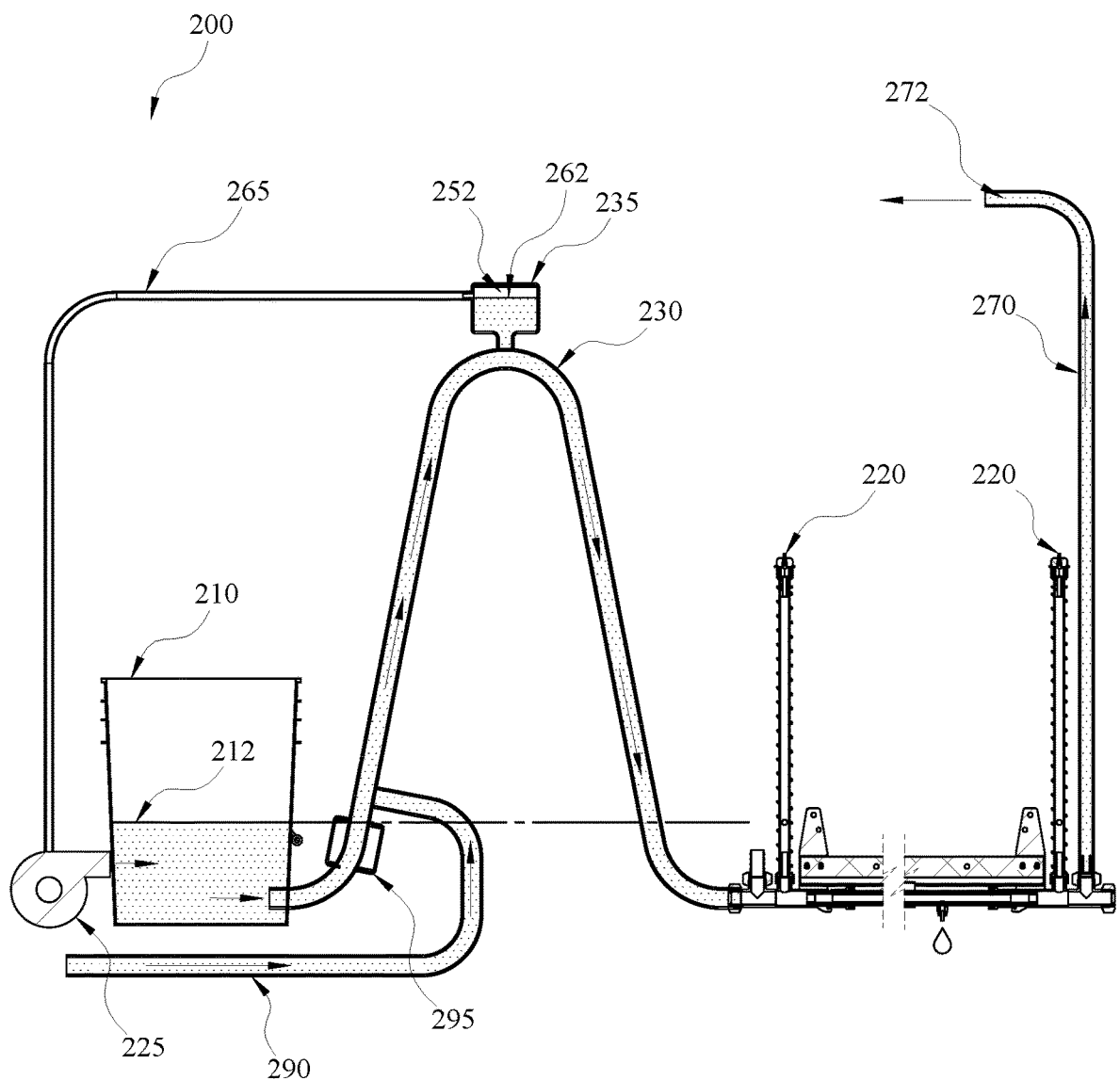

As shown in FIG. 2F, when the system 200 is to be started for the first time or after being drained between uses, it is put into a "charge" mode. Charging the system 200 purges all air from the system 200 and allows for the Negative Pressure in the Water Conduit 230 to be generated. The Vacuum Apparatus 225 is used to remove all Entrapped Air 252 in the Air Reservoir 235 that is built up during this time. For a complete purge, a flush outlet line 270 with a smaller diameter conduit that has an outlet 272 at a height above the level of water 262 inside the Air Reservoir 235 is preferably included to increase back pressure within the system 200.

Furthermore, in order for the system 200 to be charged, high pressure water must flow through the Water Conduit 230 and through all the poultry drinker lines 220. This is accomplished using a high-pressure charge/flush bypass line 290. In conjunction with this bypass line 290, a backflow prevention Check Valve 295 is added, inside the system 200, below the water level 212 in Reservoir 1 (210), to avoid the reintroduction of water (i.e., backflow of water) back into Reservoir 1 (210).

B. System Description of Preferred Embodiments

1. High Level System Overview

An improved, self-balancing water distribution system uses siphon principles, in accordance with the above operational theory, to maintain Negative Pressure within the water system and to enable distribution of water to one or more distribution points (such as drinker lines with drinker nipples), at a controlled pressure, for consumption by poultry. The system includes Water Conduit connected to and configured to distribute water from a water supply reservoir to the one or more distribution points. The water level of the reservoir is used to control the water pressure within the system. A Vacuum Apparatus or similar air removal system is connected to the Water Conduit to remove Entrapped Air within the system to help maintain Negative Pressure within the Water Conduit and throughout the system.

In preferred embodiments, it is advantageous to have the Water Conduit routed across the ceiling of the facility to minimize clutter along the floor of the facility. As will become apparent herein, multiple drinker lines can be operated and controlled by one or more water supplies or supply regulators that can be located at any point in the system. The systems disclosed and described herein enable the water flow to the drinker lines to be much greater than what is provided by current, conventional systems that use one or more water pressure regulators on each drinker line. Due to the elimination of water pressure regulators on the drinker lines, the system has fewer moving parts and, thus, increased reliability against mechanical failure Calibration of the drinker lines is preferably done automatically and simultaneously by gravity, which reduces the involvement required by facility operators and reduces the potential for user error, which is a common risk with systems in the field today.

With the current system, when there is high demand on the system from the drinker lines, there is a much smaller pressure drop than that which occurs in conventional systems currently in use in the industry.

Since all of the pressures in the drinker lines can be adjusted from one point or automatically, the labor costs for making adjustments throughout the poultry growth period is greatly reduced. As will be explained herein, the system can be controlled both mechanically and electrically.

Figure 3A:
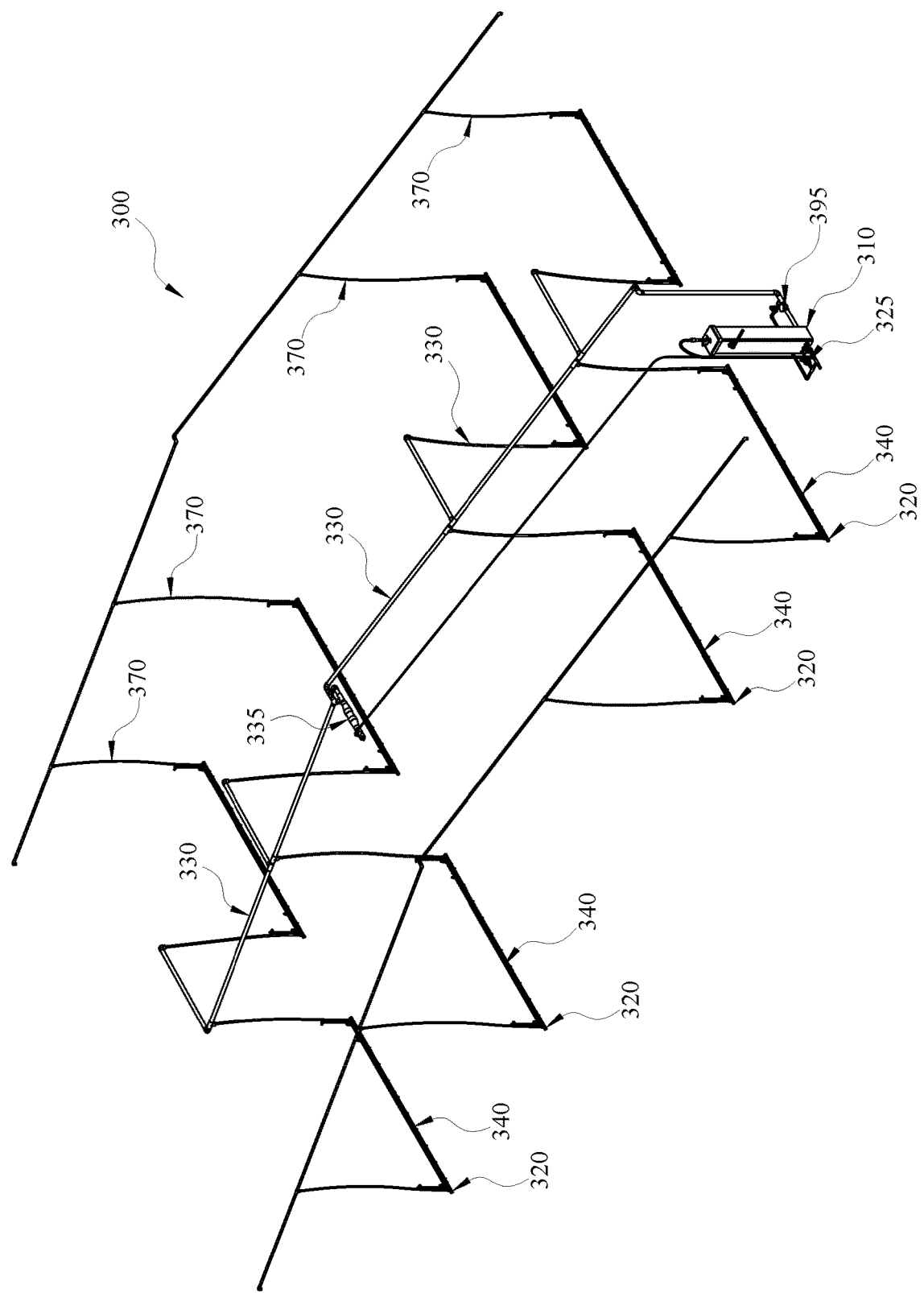
FIG. 3A illustrates a perspective view of a poultry watering system using the techniques described in FIGS. 2A-2F.
Figure 3B:
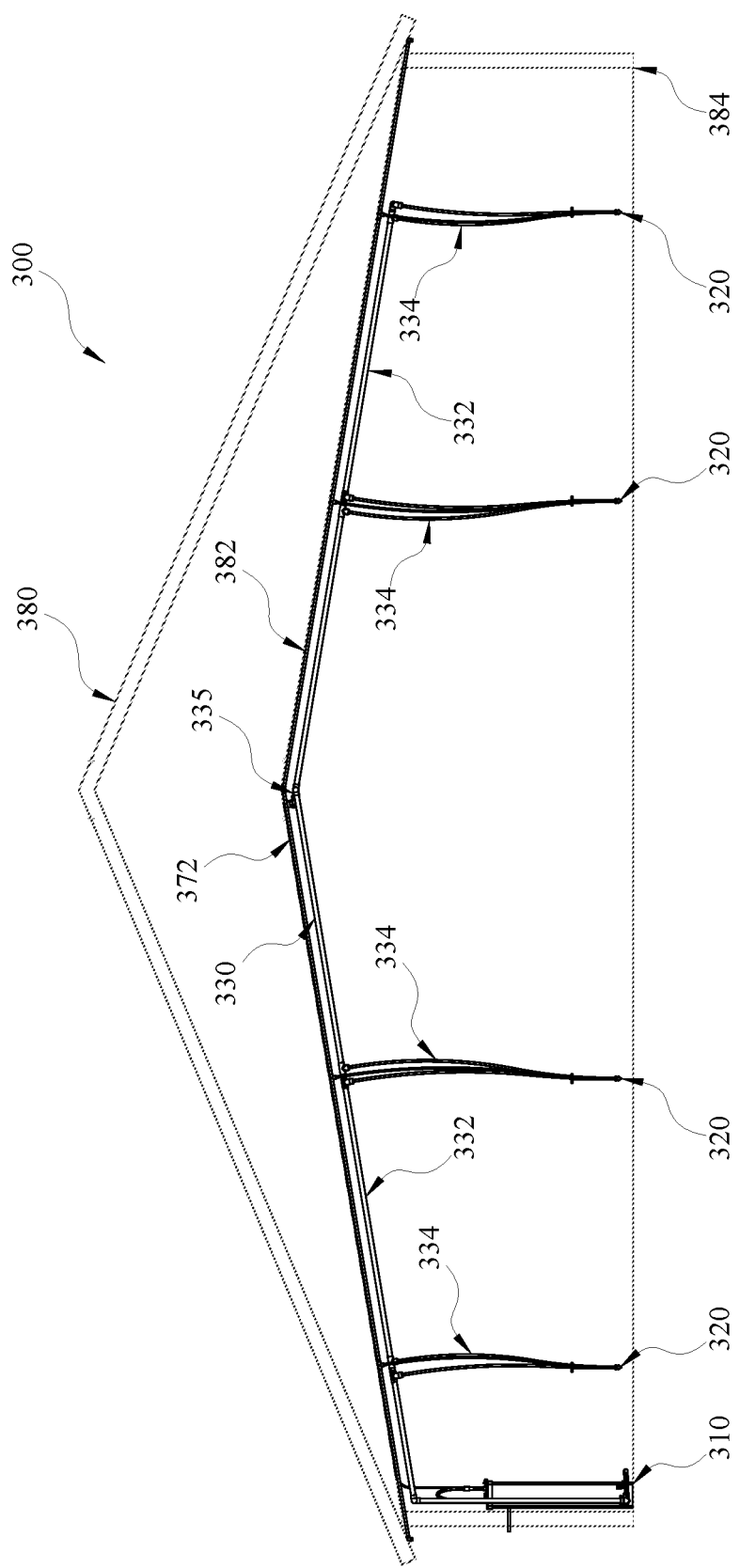
FIG. 3B illustrates a side view of the poultry watering system of FIG. 3A.

Turning now to FIGS. 3A and 3B, an exemplary poultry watering system 300, as would be installed in a poultry house or facility, is illustrated. FIG. 3A illustrates the system 300 in perspective view, and FIG. 3B illustrates the same system 300 from a side view. The system 300 includes a Reservoir 1 (310), which is a non-pressurized water supply tank, and a Reservoir 2 (320), which represents one or more poultry drinker lines installed above the floor of the facility and each having a plurality of conventional drinking nipples (not shown) that are positioned at a height above the floor that are easily accessible to the poultry within the facility. The water drawn by the poultry from the drinker lines 320 represents the Demand 340 on the system 300. Preferably, Reservoirs 1 and 2 (310, 320) are located at relatively similar heights, but at different locations, within the facility. Reservoirs 1 and 2 (310, 320) are connected using a Water Conduit 330. Preferably, a Check Valve 395 is located between Reservoir 1 (310) and Reservoir 2 (320) to prevent backwards flow of water into Reservoir 1 (310) from the Water Conduit 330. The system 300 operates by utilizing a Negative Pressure within the Water Conduit 330, which balances water levels or pressures automatically within the one or more poultry watering/drinker lines 320 using gravity and being responsive to the water level in Reservoir 1 (310). In this system 300, the Air Reservoir 335 is located somewhere along the Water Conduit 330, preferably at its highest point, so that Entrapped Air is directed to this location. Preferably, the Water Conduit 330 is configured so that there are no pockets or interim "high" points located within the system that would allow air to become entrapped inside the Water Conduit 330 without being able to reach the Air Reservoir 335. Preferably, a Vacuum Apparatus 325 is attached to the Air Reservoir 335, using a vacuum line 365, at the highest point in the Air Reservoir 335 to allow for the maximum amount of Entrapped Air to be removed. When the Entrapped Air is purged from the Air Reservoir 335, it returns to Reservoir 1 (310) via the vacuum line 365 in the form of an air/water mix. Advantageously, this allows all the water removed by the Vacuum Apparatus 325 from the Air Reservoir 335 to be recycled. The air removed by the Vacuum Apparatus 325 is discharged into the Reservoir 1 (310) and is able to vent to atmosphere.

The purpose of the Air Reservoir 335 is to provide a location within the system 300 in which Entrapped Air can accumulate without compromising the operation of the system. When the volume of Entrapped Air in the Air Reservoir 335 reaches a predetermined setpoint, an electrical control system (not shown, but described hereinafter) activates the Vacuum Apparatus 325, which removes the Entrapped Air from the system 300 and maintains the Negative Pressure within the Water Conduit 330 that ensures continued system operation. Flush outlet plumbing lines 370 extend from the ends of the drinker lines 320 and then run vertically and connect to flush outlet lines 372.

As shown in FIG. 3B, the position of the system 300 is shown relative to the facility exterior roof 380, and the interior ceiling 382 and flooring 384. The Water Conduit 330 includes a top supply line 332 that runs below and along interior ceiling 382 and drop lines 334 that run from the top supply lines 332 down to the one or more poultry drinker lines 320. Flush outlet lines 372 are mounted at a height above the Air Reservoir 335 in order to prevent the system 300 from draining during Negative Pressure loss.

2. Air Reservoir Design

Figure 4:
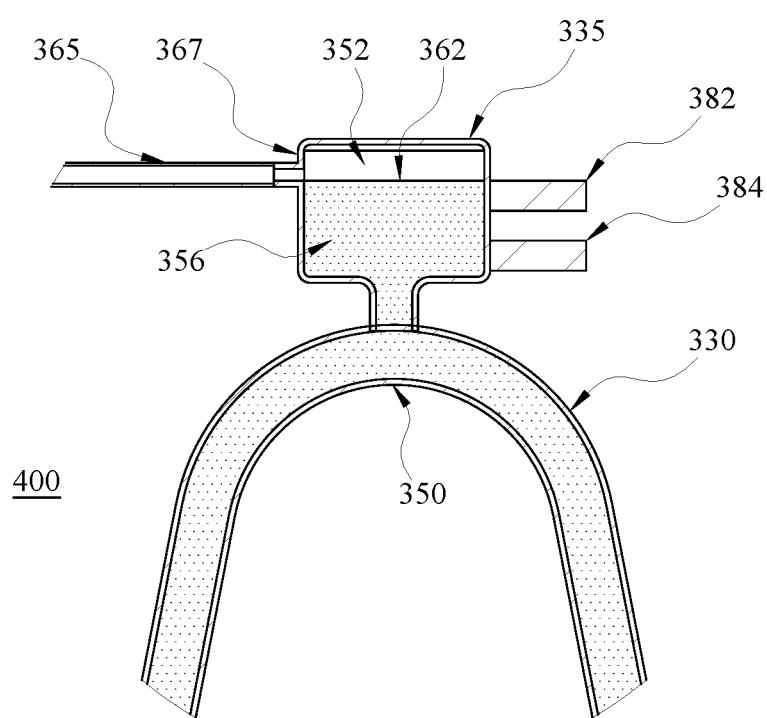
FIG. 4 illustrates an enlarged, side view of the Air Reservoir and surrounding components of the poultry watering system of FIGS. 3A and 3B.

Turning now to FIG. 4, elements of the Air Reservoir 335 and surrounding components of the system 400 are shown in greater detail. As previously described, Air Reservoir 335 is positioned above and at a higher elevation than the peak 350 of Water Conduit 330. The Air Reservoir 335 can be of any suitable shape. The bottom or lower portion of the Air Reservoir 335 connects with the Water Conduit 330. A port 367 for receiving and connecting with the vacuum line 365 that connects with the Vacuum Apparatus (not shown in FIG. 4) is positioned near the top or highest portion of the Air Reservoir 335.

Inside the Air Reservoir 335, two sensors (high level float switch sensor 382 and low level float switch sensor 384) measure the level 362 of water 356 within the Air Reservoir 335, which defines the dividing line between the Entrapped Air 352 and the water 356 within the Air Reservoir 335. The two sensors (high level float switch sensor 382 and low level float switch sensor 384) are preferably connected to a control circuit or controller (not shown but described in greater detail hereinafter) in communication with the Vacuum Apparatus 325 (shown in FIG. 3A) to determine when to activate or deactivate the Vacuum Apparatus 325. Sensor 382 is preferably configured as the high level float switch that determines the water level 362 within the Air Reservoir 335. When the water level 362 within the Air Reservoir 335 falls below the high level float switch sensor 382, the Vacuum Apparatus 325 is activated to begin removing Entrapped Air 352 from the Air Reservoir 335. The Vacuum apparatus 325 will continue to remove the Entrapped Air 352 from the Air Reservoir 335 until the water level 362 rises above the high level float switch sensor 382. Sensor 384 is preferably configured as the low level float switch, which determines when the water level 362 has reached a low level within the Air Reservoir 335 requiring an "auto charge" (i.e. addition of water required) condition to occur. When the water level 362 within the Air Reservoir 335 falls below the low level float switch sensor 384, the system is placed into an auto charge condition whereby the system becomes pressurized with high pressure water. This auto charge condition will continue until the water level 362 rises above the low level float switch sensor 384.

3. Control Systems

The control system that is used to maintain the water level or pressure in Reservoir 1 can be either mechanical or electrical, as described in greater detail below.

Figure 5:
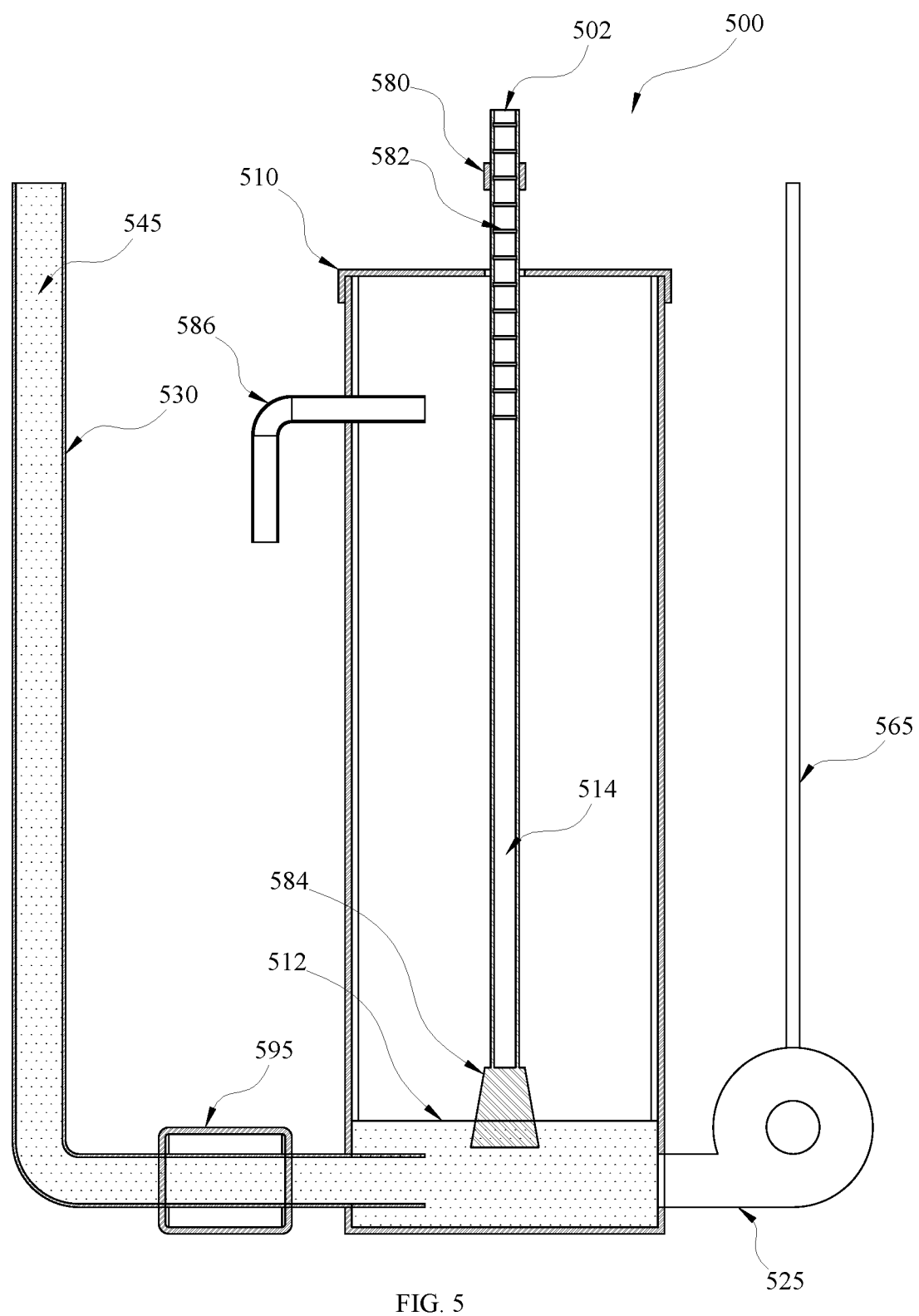
FIG. 5 illustrates an enlarged, side view of preferred Reservoir 1 components used in the poultry watering system of FIGS. 3A and 3B.

As illustrated in FIG. 5, mechanical control system 500 includes Reservoir 1 (510). Incoming water is provided into Reservoir 1 (510) through water line 502. A mechanical level control 580 is used to control the water level 512 inside Reservoir 1 (510), which is used to control the water level and corresponding water pressure at the drinking nipples (not shown). The mechanical level control 580 includes water column/pressure setting indicator marks 582 that provide visible indicators, outside of Reservoir 1 (510), that correspond to the water level/pressure inside of Reservoir 1 (510) to enable a user visually to adjust and set the desired water level/pressure inside Reservoir 1 (510). The mechanical level control 580 includes a mechanical float valve 584 mounted to the end of a water supply conduit 514. This mechanical level control 580 is adjusted vertically according to the column/pressure setting indicator marks 582 to allow the water level 512 in Reservoir 1 (510) to maintain a constant level corresponding to the level of the mechanical float valve 584, as indicated by the water column setting indicator marks 582. An overflow outlet 586 is provided as a failsafe to allow Reservoir 1 (510) to drain in case the water supply does not shut off properly when the desired water level is reached or in any other situation in which too much water collects in Reservoir 1 (510).

As previously described, Vacuum Apparatus 525 is connected into the lower portion of Reservoir 1 (510) to aspirate air or air/water mixture from the Air Reservoir (not shown) and return it to the Reservoir 1 (510). The aspirate air or air/water mixture from the Air Reservoir is provided to Vacuum Apparatus 525 through the vacuum line 565 coming from the Air Reservoir. During regular operation, a vacuum apparatus valve (not shown) remains closed to prevent the aspirated air or air/water mixture from backing up or otherwise entering the system without first going into Reservoir 1 (510). Water Conduit 530 is also connected near the bottom of Reservoir 1 (510) and provides outgoing water 545 to the rest of the system and particularly to the watering/drinker lines (not shown), as described previously. A backflow prevention Check Valve 595 is included on the Water Conduit 530, below the water level 512 in Reservoir 1 (510), to avoid the reintroduction of water (i.e., backflow of water) back into Reservoir 1 (510). In order for the system to be charged and ready for use, high pressure water must flow through the Water Conduit 530 and through all the poultry drinker lines until Negative Pressure is attained.

In summary, the high pressure float valve 584 located inside of Reservoir 1 (510) is adjustable in the vertical direction in order to control and maintain the water level 512 in Reservoir 1 (510). As previously described, one or more water level float switch sensors are used to detect Entrapped Air in the Air Reservoir and purge the air by means of the electrically controlled Vacuum Apparatus.

In an alternative embodiment, an electrical control system can be used in lieu of or in conjunction with the mechanical control system 500 illustrated in FIG. 5. The electrical control system has the same components as those used by the mechanical control system 500 with the following modifications. An electronic controller (not shown) utilizing an electronic pressure sensor installed within Reservoir 1 (510) is used to determine the water level 512 within Reservoir 1 (510). The controller is also utilized as a means to set the desired water level or pressure within Reservoir 1 (510). A high pressure electrically-controlled water supply valve (not shown) is preferably installed on water line 502 to manage the flow of water into Reservoir 1 (510). The mechanical level control 580 and mechanical float valve 584 are used as a failsafe back-up in case of electrical system failure. The controller is also used to charge or flush the system and to operate the Vacuum Apparatus 525 to control the purging of the air from of the Air Reservoir.

The system 500 also provides an alarm mechanism to indicate an environmental situation that would prohibit the safe and proper operation of the water level control. In addition, this alarm mechanism is designed to be functional in case of a failure with the controller. Through use of standardized signaling techniques connected to external monitoring devices provided by others, the system 500 is able safely and reliably to signal the presence of a system fault, even in the event of total power or circuit failure.

In addition to the monitoring and alarm features of the control system, the system 500 provides for an electromechanical backup that operates independently of the control system, to further ensure the safety and reduce the risk of potential hazards to the poultry. This electro-mechanical backup allows for the continued operation of the supply water circuit even in the event of a loss of the controller. Coupled with the mechanical level control backup feature of the water distribution system, as previously described, there exists a completely redundant, electro-mechanical failsafe system to ensure the safe and reliable operation of the water distribution system even in the event of a complete control system failure.

Figure 6:
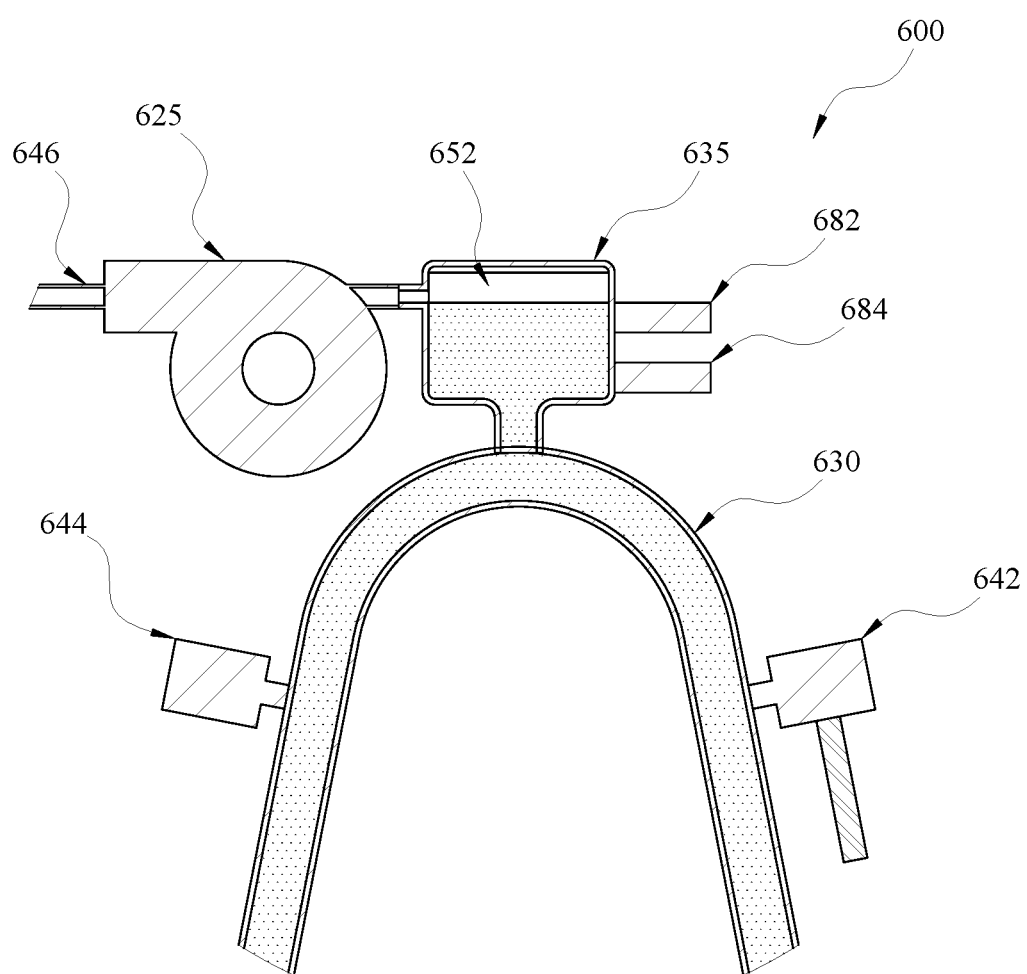
FIG. 6 illustrates an enlarged, side view of an alternative water level control system for use with the poultry watering system of FIGS. 3A and 3B.

Turning now to FIG. 6, in an alternative embodiment, the system 600 eliminates the need for the type of Reservoir 1 described above. A water supply valve 642 along with a pressure sensor 644 are located anywhere along the Water Conduit 630 or in the drinker lines (not shown). The balancing of the water pressure in the drinker lines is still accomplished automatically through gravity, and the system 600 allows for all the pressures in the drinker lines to be the same and simultaneously adjustable. In a preferred embodiment, the water supply valve 642 is a proportional valve placed in series with a solenoid valve, which is effective in reducing the fluctuation of the water pressure in the lines; however, this could be accomplished with other valve types or combinations as well. The function of the Air Reservoir 635 remains the same as the previously-described system design utilizing a high level water sensor 682 to control the Vacuum Apparatus 625 to activate the Vacuum Apparatus 625 to remove Entrapped Air 652. A low level water sensor 684 is used to activate the "auto charge" mode, which added pressurized water to the system. A key difference between this system 600 and the previously-described system designs is that the waste air or air/water mix from the Vacuum Apparatus 625 is no longer reclaimed in Reservoir 1, but instead flows down a dedicated line 646 to one of the drinker lines (not shown). When the air or air/water mix is released into the drinker lines, the air is released to atmosphere through a breather in the drinker line and the water remains in the system 600. Routing the air or air/water mix discharge line 646 to the drinker line also acts as a Check Valve to keep the air from re-entering the system 600 backwards through the Vacuum Apparatus 625.

Figure 7:
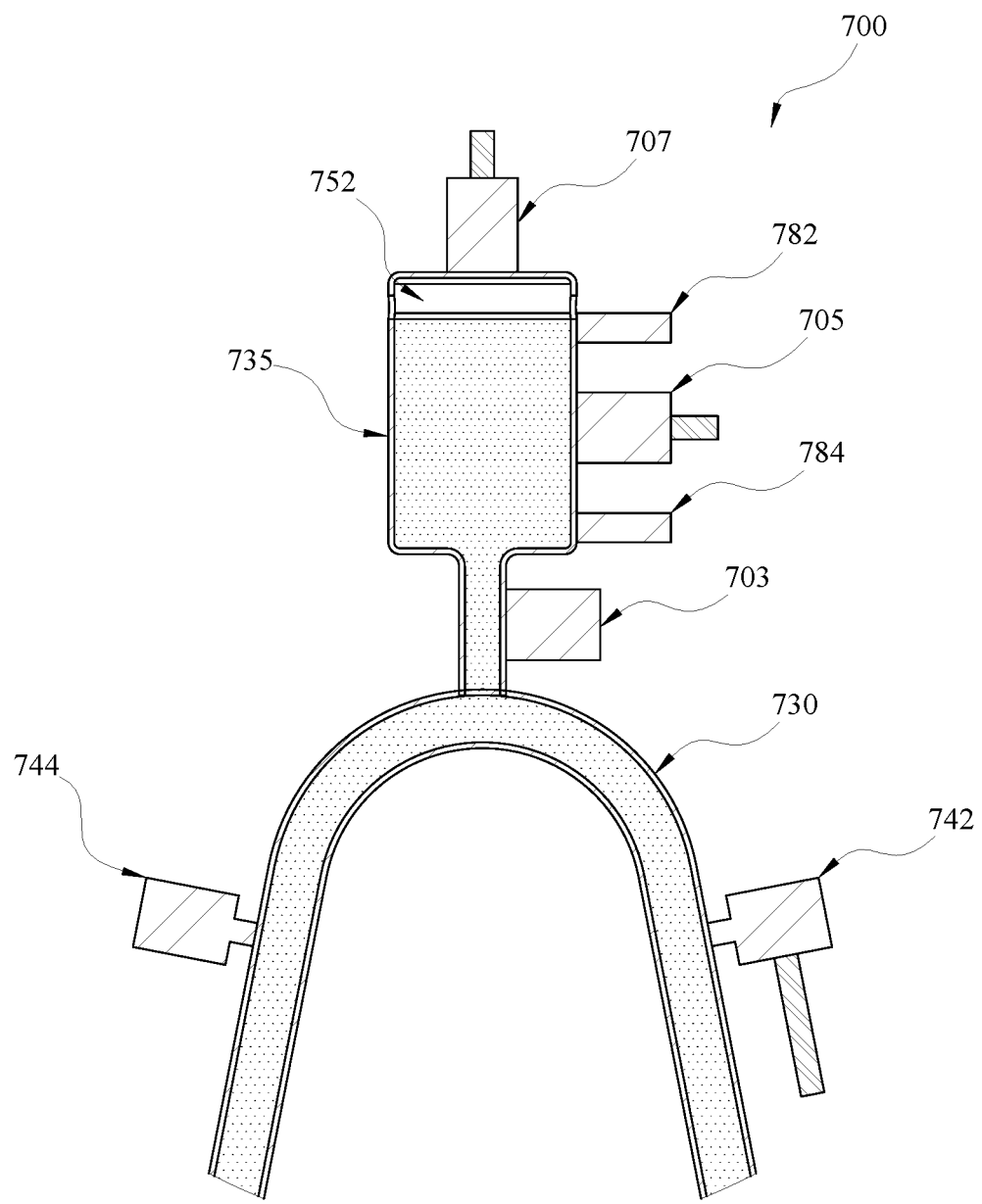
FIG. 7 illustrates an enlarged, side view of yet another alternative water level control system for use with the poultry watering system of FIGS. 3A and 3B.

Turning now to FIG. 7, in another alternative embodiment, the system 700 also eliminates the need for the type of Reservoir 1 described above. A water supply valve 742 along with a pressure sensor 744 are located anywhere along the Water Conduit 730 or in the drinker lines (not shown). The balancing of the water pressure in the drinker lines is still accomplished automatically through gravity, and the system 700 allows for all the pressures in the drinker lines to be the same and simultaneously adjustable. In a preferred embodiment, the water supply valve 742 is a proportional valve placed in series with a solenoid valve, which is effective in reducing the fluctuation of the water pressure in the lines; however, this could be accomplished with other valve types or combinations as well.

The Air Reservoir 735 in this embodiment works differently from the previously-described Air Reservoirs and represents an alternate means for air removal because the system 700 does not require the use of a Vacuum Apparatus. A first solenoid valve 703 is located between the Water Conduit 730 and the Air Reservoir 735 and has the purpose of isolating the Air Reservoir 735 from the rest of the system 700. A second solenoid valve 705 connected to a high pressure water supply (not shown) is located in a manner that allows it to feed the Air Reservoir 735 with high pressure water, when activated. A third solenoid valve 707 is located at the top of the Air Reservoir 735 and allows Entrapped Air 752 from the Air Reservoir 735 to be vented, when activated, to atmospheric pressure. During normal operation, when there is no need for air removal, the first solenoid valve 703 is in the open position, second solenoid valve 705 is in the closed position, and third solenoid valve 707 is in the closed position. When the volume of Entrapped Air 752 in the Air Reservoir 735 becomes large enough that the water level triggers a low level water sensor 784, the following process begins: (1) first solenoid valve 703 changes to the closed position, (2) second solenoid valve 705 and third solenoid valve 707 change to the open position, (3) water flows into the Air Reservoir 735 through the second solenoid valve 705 and the Entrapped Air 752 flows out of the third solenoid valve 707 to atmosphere, which causes the water level in the Air Reservoir 735 to rise. This process continues until the water level reaches the high level water sensor 782, at which point (4) the second solenoid valve 705 and the third solenoid valve 707 change to the closed position, (5) the first solenoid valve 703 changes to the open position allowing the pressure in the Air Reservoir 735 to equalize with the Negative Pressure within the system 700 and the system 700 resumes normal operation.

Figure 8:
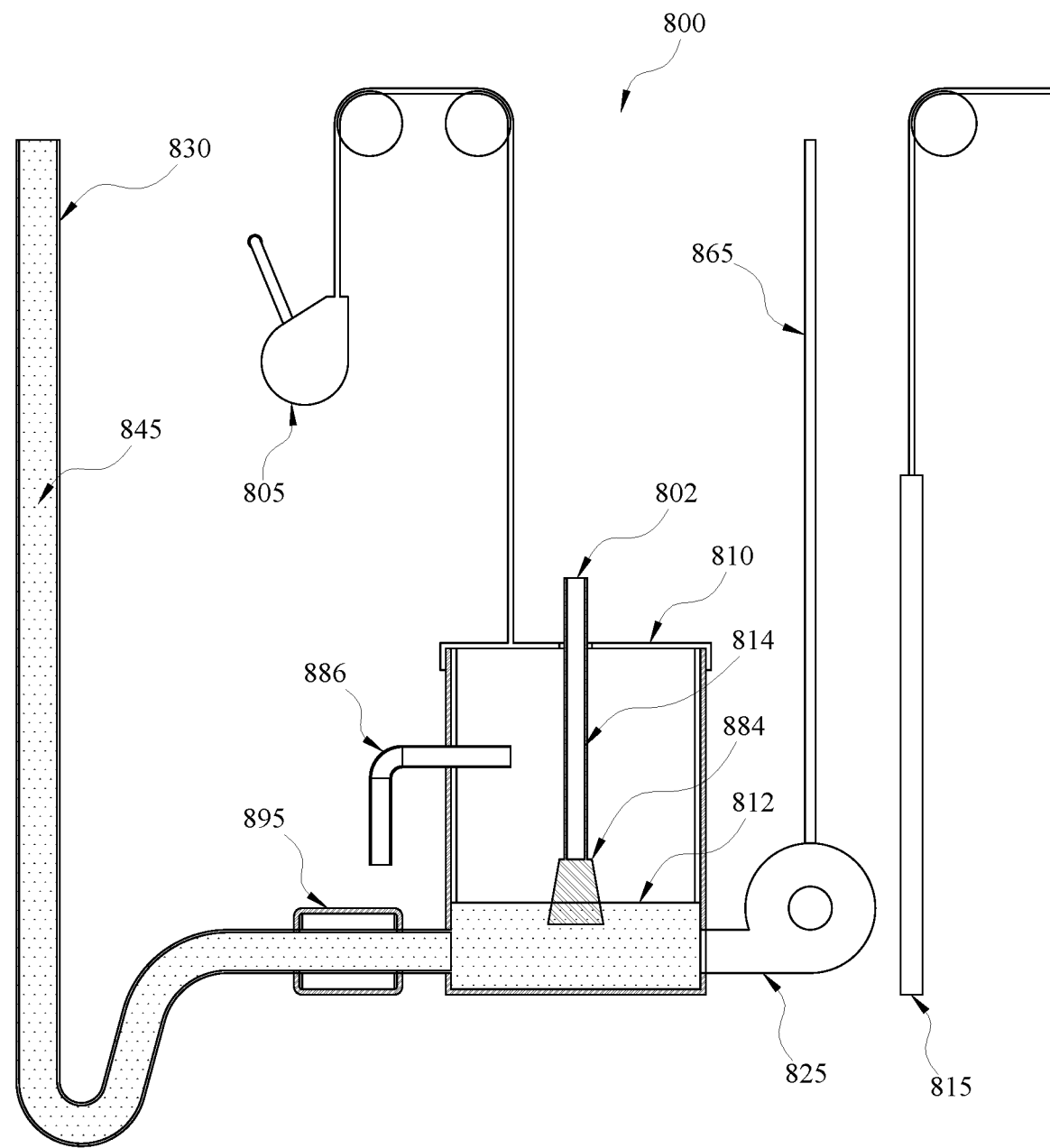
FIG. 8 illustrates an enlarged, side view of an alternative reservoir and water level control system for use with the poultry watering system of FIGS. 3A and 3B.

Turning now to FIG. 8, an alternative water level control system 800 is illustrated. In lieu of changing the water level 812 in the Reservoir 1 (810) to change the water level in the drinker lines, the alternative water level control system 800 provides a Reservoir 1 (810) having a static water level 812, but physically raising or lowering of Reservoir 1 (810) changes the effective water level of the Reservoir 1 (810) relative to the floor of the facility, which adjusts the pressure in the drinker lines.

The benefits of such an alternative embodiment include: (i) providing a system 800 that is very responsive to water pressure setpoint adjustments because there is no delay caused by the filling and/or draining of the Reservoir 1 (810) to match the desired setpoint, (ii) Reservoir 1 (810) controls are no longer dependent on electrical components, (iii) a water level failsafe is built into the Reservoir 1 (810) assembly and is automatically moved when adjusting water pressure setpoint in the drinker lines, and (iv) Reservoir 1 (810) assembly can be much smaller and can require less water volume to start up.

As shown in FIG. 8, alternative water level control system 800 has many of the same basic components as previous designs. These components include an incoming water supply input line 804, a Vacuum Apparatus 825, a mechanical level control which includes the mechanical float valve 884 that is attached to a water supply conduit 814 that is vertically mounted into the top of Reservoir 1 (810), a failsafe overflow outlet 886, Water Conduit 830 that is connected near the bottom of Reservoir 1 (810) and provides outgoing water 845 to the watering/drinker lines, a backflow prevention Check Valve 895 that is included on the Water Conduit 830 below the water level 812 in Reservoir 1 (810) to avoid the backflow of water into Reservoir 1 (810), and a Vacuum Apparatus line 865 connected to the Vacuum Apparatus 825 for transporting the aspirated air and air/water mixture from the Air Reservoir (not shown) back to Reservoir 1 (810).

A water column height chart 815 is used to identify the water level and pressure provided to the drinker lines. A manual, pneumatic, or electrically-controlled height adjustment system 805, such as a pulley and winch system, connects to Reservoir 1 (810) and is used to raise and lower the Reservoir 1 (810) to set the desired water level 812 and corresponding pressure at the drinker lines. Although height adjustment system 805 is shown as a pulley and winch system, any other apparatus or components capable of controlled raising or lowering of the Reservoir 1 (810) may be used to advantage.

In yet a further alternative embodiment, a mechanical negative pressure control device is used in lieu of or in conjunction with the Reservoir 1 described above. This mechanical negative pressure control device provides a mechanical adjustment for control of the negative pressure in the Water Conduit by controlling the supply of water from the Water Supply. A self-regulating technique is employed to allow the regulation of the Water Supply to maintain a constant negative pressure within the self-contained Reservoir 1, directly connected to the inlet of the Water Conduit and sealed from atmospheric pressure. One key difference between this system and previously-described systems is that the waste air or air/water mix from the Vacuum Apparatus is not reclaimed in Reservoir 1, but instead flows down a dedicated line to one of the drinker lines. When the air or air/water mix is released into the drinker line, the air is released to atmosphere through a breather in the drinker line and the water remains in the system.

In yet a further embodiment, an electrical control system is used in conjunction with the mechanical control system described above. The electrical control system has the same operational characteristics of the mechanical system, as described above, with the addition of an electro-mechanical adjustment for controlling the supply of water from the Water Supply. An electronic controller and sensor are used to provide control adjustment, system feedback, monitoring and other features as described above in alternative embodiments having electrical control.

4. Operating Modes

The system includes a controller that monitors the environment and performs adjustments through various system components according to the user-selected Operating Modes. The Operating Modes define the behavior of the system when responding to the various environmental inputs. The Operating Mode and several user parameters may be altered by the user through a user interface or externally through a peripheral interface. The Operating Modes includes an OFF status, a RUN status (or normal operation, a CHARGE status used to add pressurized water to the system to bring it to a Negative Pressure condition, and a FLUSH status, which is used when the system needs to be flushed for cleaning purposes or prior to being switched into OFF status.

In view of the foregoing detailed description of preferred embodiments of the present invention, it readily will be understood by those persons skilled in the art that the present invention is susceptible to broad utility and application. While various aspects have been described herein, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A poultry watering system, comprising:
   a water supply reservoir containing water at a water level associated with the reservoir;
   one or more water distribution points for providing the water to poultry at a desired pressure level; and
   water conduit connecting the water supply reservoir to the one or more water distribution points, the water conduit configured to be substantially filled with pressurized water maintained at a negative pressure;
   wherein the desired pressure level of the water provided to the poultry is directly responsive to the water level associated with the reservoir.

2. The system of claim 1 wherein each of the one or more water distribution points comprises a drinker line and a water column having a water column level, the drinker line having a plurality of drinker nipples for providing the water to the poultry at the desired pressure level, wherein the water column level within the water column established the desired pressure level of the potable water at the drinker nipples.

3. The system of claim 2 wherein the poultry watering system is mounted within a poultry house having a floor and wherein the water supply reservoir and the water distribution points are positioned at relatively similar heights above the floor such that the water level within the water column is the same height above the floor as the water level associated with the reservoir.

4. The system of claim 3 wherein the water level associated with the reservoir is adjusted by adding or removing water from the reservoir.

5. The system of claim 3 wherein the water level associated with the reservoir is adjusted by adjusting the height of the reservoir above the floor.

6. The system of claim 1 wherein the water supply reservoir is a tank containing non-pressurized, potable water and wherein the water conduit connects at or near the bottom of the water supply reservoir.

7. The system of claim 1 wherein the water conduit is further configured to have one peak location disposed above the water supply reservoir and the one or more water distribution points, wherein air entrapped within the water conduit accumulates at the peak location; and wherein an air removal component is connected to the water conduit at the peak location and configured to remove the entrapped air as needed to maintain the negative pressure within the water conduit.

8. The system of claim 7 wherein the air removal component includes an air reservoir connected to the water conduit above the peak location, the air removal component further including a vacuum apparatus having a vacuum line connected to the air reservoir for aspirating the entrapped air and an exhaust line for discharging the aspirated air into the water supply reservoir.

9. The system of claim 8 wherein the vacuum apparatus removes a mixture of entrapped air and water from the air reservoir and discharges the air/water mixture into the water supply reservoir.

10. The system of claim 9 wherein the water supply reservoir is open to atmosphere and wherein the water from the air/water mixture discharged into the water supply reservoir is recycled back into the water conduit and the air from the air/water mixture discharged into the water supply reservoir is released to the atmosphere.

11. The system of claim 8 wherein the air reservoir includes a high level water sensor to detect when the amount of entrapped air is less than a desired minimum threshold such that entrapped air does not need to be removed to maintain negative pressure within the water conduit.

12. The system of claim 8 wherein the air reservoir includes a low level water sensor to detect when the amount of entrapped air is more than a desired maximum threshold such that entrapped air needs to be removed to maintain negative pressure within the water conduit.

13. The system of claim 12 wherein, when the low level water sensor detects that the amount of entrapped air is more than the desired maximum threshold, pressurized water is added directly to the water conduit through a water supply that by-passes the water supply reservoir.

14. The system of claim 8 wherein the air removal component further includes a check valve to prevent backflow of aspirated air from the vacuum apparatus into the air reservoir.

15. The system of claim 1 wherein the water conduit further includes a check valve to prevent the backflow of water from the water conduit into the water supply reservoir.

16. A poultry watering system, comprising:
   water conduit connecting a water supply to one or more water distribution points, the water conduit configured to be substantially filled with pressurized water maintained at a negative pressure;
   the one or more water distribution points providing the water to poultry at a desired pressure level, wherein each of the one or more water distribution points comprises a drinker line and a water column having a water column level, the drinker line having a plurality of drinker nipples for providing the water to the poultry at the desired pressure level, wherein the water level within the water column establishes the desired pressure level of the water at the drinker nipples; and
   a water supply valve and a pressure sensor connected to the water conduit, the water supply valve is responsive to the pressure sensor and is configured to control the flow of water from the water supply into the water conduit;
   wherein the desired pressure level of the water provided to the poultry is directly responsive to the pressure of the water in the water conduit detected by the pressure sensor.

17. The system of claim 16 wherein the water conduit is further configured to have one peak location disposed above the one or more water distribution points, wherein air entrapped within the water conduit accumulates at the one peak location and wherein an air removal component is connected to the water conduit at the one peak location and configured to remove the accumulated entrapped air as needed to maintain the negative pressure within the water conduit.

18. The system of claim 17 wherein the air removal component includes an air reservoir connected to the water conduit above the one peak location, the air removal component further including a vacuum apparatus having a vacuum line connected to the air reservoir for aspirating the entrapped air and an exhaust line for discharging the aspirated air into one or more of the water distribution points.

19. The system of claim 18 wherein the vacuum apparatus removes a mixture of entrapped air and water from the air reservoir and discharges the air/water mixture into the one or more of the water distribution points, wherein the one or more of the water distribution points is open to atmosphere and wherein the water from the air/water mixture is provided to the poultry through one or more of the drinker lines and the air from the air/water mixture is released to the atmosphere through a breather associated with the one or more of the drinker lines.

20. The system of claim 17 wherein the air removal component includes an air reservoir connected to the water conduit above the one peak location, the air removal component further including both the water supply valve for receiving the potable water under pressure from the potable water supply and an air release valve for discharging accumulated entrapped air to atmosphere, the water supply valve and the air release valve activated as needed to maintain the negative pressure within the water conduit.

* * * * *